United States Patent [19]
Fujio et al.

[11] 3,910,662
[45] Oct. 7, 1975

[54] APPARATUS FOR PRODUCING FLUORESCENT LAMPS

[75] Inventors: Hinomaru Fujio, Neyagawa; Kazunori Fukunaga, Osaka; Naoyuki Nakamura, Takatsuki, all of Japan

[73] Assignee: Matsushita Electronics Corporation, Osaka, Japan

[22] Filed: Oct. 23, 1973

[21] Appl. No.: 408,534

[30] Foreign Application Priority Data
Dec. 29, 1972 Japan.................................. 48-9619

[52] U.S. Cl..................................... 316/30; 65/281
[51] Int. Cl.² ............................................ H01J 9/38
[58] Field of Search ............. 316/27, 30, 31; 65/281

[56] References Cited
UNITED STATES PATENTS 2,494,923  1/1950  Yoder et al........................... 316/20
2,772,134  11/1956  Mullan.................................. 316/32

Primary Examiner—Roy Lake
Assistant Examiner—James W. Davie
Attorney, Agent, or Firm—Stevens, Davis, Miller & Mosher

[57] ABSTRACT

An apparatus for producing fluorescent lamps comprises an intermittently rotatable turret having a plurality of glass tube supporting arms extending radially from the turret. The apparatus is so arranged that a plurality of glass tubes supported from the supporting arms are simultaneously subjected to working operations such as heating, bending, evacuation, filling, sealing etc. at a plurality of stations in each of which a plurality of glass tubes are subjected to the same working operation to improve the productivity of the apparatus.

6 Claims, 4 Drawing Figures

APPARATUS FOR PRODUCING FLUORESCENT LAMPS

The present invention relates to an improvement in an apparatus for producing fluorescent lamps and, particularly, annular or ring-like fluorescent lamps.

In the art of producing annular fluorescent lamps, there has been known an exhausting machine comprising an intermittently rotatable turret having a plurality of glass tube supporting arms. The machine is so arranged that the turret is rotated intermittently or at a predetermined interval so that glass tubes supported from the supporting arms are successively subjected to several kinds of working operations such heating, bending, exhaustion, filling, sealing etc.

As an example, a prior art apparatus for producing annular fluorescent lamps conprises a turret having 24 supporting arms each having a head to which a glass tube is removably connected. When the turret of the known machine is stopped at any one of predetermined stationary positions or stations, one of the 24 heads is operated to grip a glass tube, other 6 heads support 6 glass tubes which are being pre-heated, other 4 heads support 4 glass tubes which are being heated, another head supports a glass tube which is being bent, other 10 heads support 10 glass tubes which are being exhausted, another head supports a glass tube which is being filled and sealed and the remaining one head supports a glass tube which is being detached from the head.

In order to improvde the productivity or efficiency of such a known machine, i.e., to increase the number of fluorescent lamps produced by the machine in a unit of time, it is usually attempted to shorten the time required for the operation in each station of the machine. However, since there is a minimum time inevitably necessary for each of the necessasry working operations such as the exhaustion of a tube, it is necessary not only to minimize the time while a tube is stopped, i.e., the time required for working the tube in each station but also to increase the number of stations at which various working operations are carried out. For example, assuming that a prior art machine is so arranged as to be stopped for 10 seconds at each of 10 stations at which exhaustion is carried out, the machine has a total of 100 seconds for the exhaustion. If it is intended to shorten the time for stoppage at each station to 5 seconds so as to improve the efficiency of the machine, the machine will be required to have 20 stations for the exhaustion. However, since there is a limit in the shortening of time required for the movement of each head from a station to a next one, the productivity or efficiency of the machine cannot be increased in proportion to the increase in the number of heads.

In addition, it is impossible to simply shorten the time required for a kind or kinds of working operations. For example, it is impossible to extremely shorten the time required for the bending of a glass tube because of a limit for the stress in glass tube caused by the operation.

For the reasons, there is an unavoidable limit for the improvement of productivity of this kind of machine by way of shortening the time while the machine is stopped in each station.

It is an object of the present invention to provide an improved apparatus for producing annular fluorescent lamps which is free from the difficulty discussed above and which possesses an increased productivity or efficiency.

According to the present invention, there is provided an apparatus for producing annular fluorescent lamps, comprising a turret which is intermittently rotated about its axis, a plurality of supporting arms mounted on said turret for rotation therewith and extending radially outwardly therefrom, exhaustion heads on the outer ends of said supporting arms for holding and supporting a plurality of glass tubes, heating means, bending means and exhausting means on the path of travel of glass tubes, said apparatus being so arranged that glass tubes supported by two extension heads are simultaneously subjected to the same kind of working operation. The above and other objects, features and advantages of the present invention will become apparent from the following description with reference to the accompanying drawings.

Figure 1:
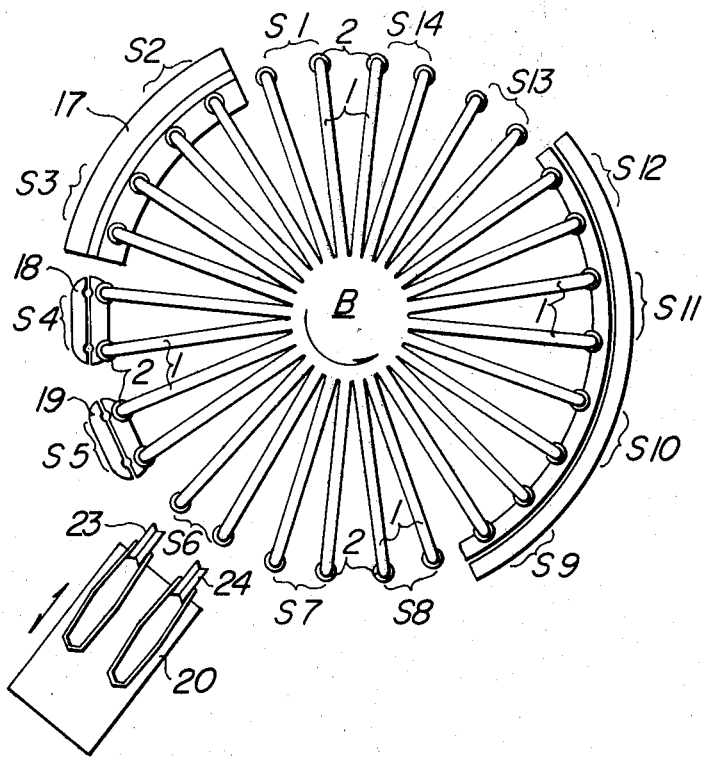
FIG. 1 is a diagrammatic plan view of an embodiment of the apparatus of the present invention.

Referring first to FIG. 1 of the drawings, an embodiment of the apparatus according to the present invention comprises a turret B having 28 tube supporting arms 1 extending radially outwardly therefrom. Each of the arms 1 has a exhausting head 2 mounted thereon at the outer end. The exhausting head 2 is adapted to be detachably connected with an exhausting tube secured to an end of a linear tube of glass having a coating of phosphor on the inner wall of the tube and an electrode mounted on the tube at one end thereof so that the head 2 supports the tube and communicates the inner space thereof with a vacuum pump (not shown) through the exhausting tube. The arms 1 are adapted to be intermittently rotated about the axis of the turret B in a direction indicated by an arcuate arrow shown in FIG. 1 in such a manner that a pair of exhausting heads 2 are successively moved through and past stations S1 through S14 disposed on a circular path of travel of the exhausting heads 2. When a pair of heads 2 are at the station S1, the heads are loaded with linear glass tubes which have not been exhausted. The glass tubes are gripped by the exhausting heads 2 at this station. At the stations S2 and S3 the glass tubes are preheated by a pre-heating furnace 17 which is so shaped and sized as to allow the glass tubes to be moved through the furnace by the rotation of the turret B. At the stations S4 and S5 are provided heating furnaces 18 and 19 each having a hollow structure of a generally oval cross-section. Each of the heating furnaces 18 and 19 is formed of two sections which can be separated apart from each other so that glass tubes can be moved into the furnace. When glass tubes are received in each of the furnaces 18 and 19, the furnace is closed for the heating of the tubes to an elevated temperature. Glass tubes are filled with an inert gas while they are being moved through and past the stations S2 through S5 to avoid oxidization of the electrodes within the tubes.

Figure 3:
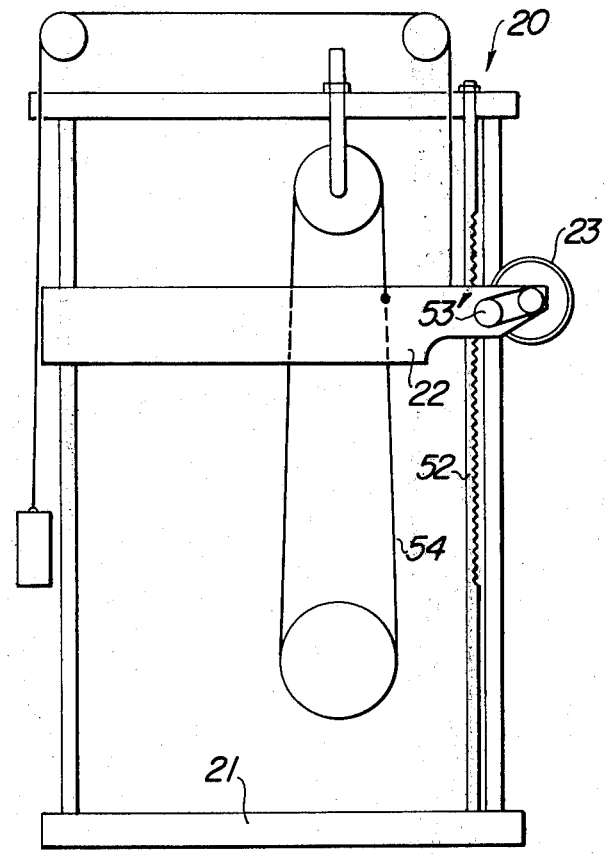
FIG. 3 is a side elevation of the tube bender with a part thereof being removed.

At the station S6 linear glass tubes are shaped into circular or annular ones by means of a tube bender 20 disposed radially outwardly of the circular path of the travel of the tubes through the station S6. The bends 20 is chiefly comprised of a base plate 21, support 22 (both shown in FIG. 3) and a pair of pulleys 23 and 24. The plate 21 is movable in radial directions with respect to the circle of travel of glass tubes as indicated by a double-headed arrow in FIG. 1. The support 22 is located above the base plate 21 and is movable up and down by a chain 54. The pulleys 23 and 24 are mounted on one end of the support 22 as will be described in more detail hereunder.

Figure 2:
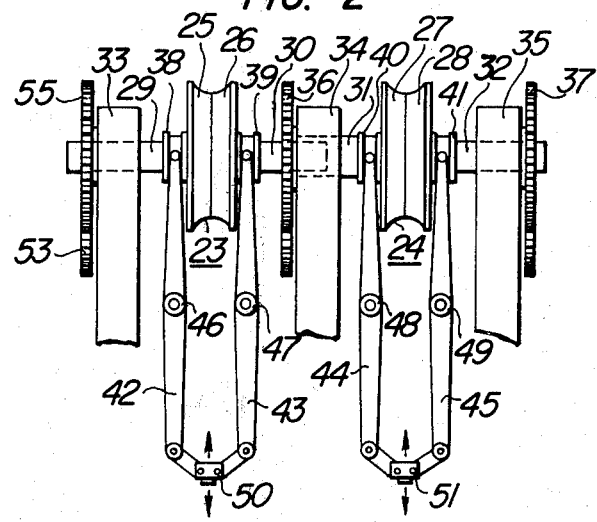
FIG. 2 is a plan view of a tube bender of the apparatus for bending glass tubes with a part of the tube bender being removed.

The apparatus of the present invention is advantageous in that two pulleys are mounted coaxially so that the tube bender is free from unnecessary mechanical elements to enable the bender to be compact and small-sized. More specifically, the pulleys 23 and 24 are respectively formed of pairs of pulley halves 25 and 26 and 27 and 28, as shown in FIG. 2. Each pair of halves are axially movable with respect to one another into and out of mutual abutting engagement with each other to complete or divide a pulley. The four pulley halves 25, 26, 27 and 28 are secured to axles 29, 30, 31 and 32, respectively, which in turn are journaled by bearings 33, 34 and 35, respectively, and are driven by gears 55, 36 and 37. The axles 29 through 32 are formed with splines through which the axles are drivingly connected to the gears 55, 36 and 37 but are axially slidably movable with respect to these gears. Particularly, the axle 31 is in the form of a tube having splined inner and outer surfaces. The axle 31 is drivingly connected to the axle 30 through the splines on the inner surface of the axle 31 and on the outer surface of the axle 30 and is also drivingly connected to the gear 36 through the spline on the outer surface of the axle 31 and a sprocket (not shown) on the gear 36. The axles 29 through 32 have secured thereto wheels 38, 39, 40 and 41, respectively, having circumferentially extending grooves in which rollers on one ends of levers 42, 43, 44 and 45 are rotatably received. These levers have intermediate portions pivotally mounted on a machine frame by means of pivot pins 46, 47, 48 and 49, respectively. The other ends of the levers 42 and 43 are pivotally connected to a link means 50 while the other ends of the levers 44 and 45 are similarly connected to a second link means 51. The link means 50 is movable toward and away from the pulley 23 by a hydraulic mechanism, not shown, so that the pair of the circumferentially grooved wheels 38 and 39 and the associated pulley halves 25 and 26 are axially movable toward and away from each other. The second link means is also actuated by a hydraulic mechanism, not shown, for a similar operation. Further details of the bender 20 will not be described herein and it will be sufficient for the applicants to make a reference to U.S. Pat. No. 2,494,923 granted to J. Yoder et al. and disclosing method and apparatus for bending and exhausting tubular lamps.

In operation, a pair of non-exhausted linear glass tubes are gripped by a pair of exhausting heads 2 at the station S1 so that the glass tubes extend vertically. As the turret B of the apparatus is rotated, the exhausting heads are moved together with the gripped glass tubes to the stations S2 and S3 in which the glass tubes are pre-heated by the pre-heating furnace 17 from which the glass tubes are then moved to the stations S4 and S5 in which the glass tubes are further heated to their softening temperature. When the heated glass tubes are moved to the station S6, the tube bender 20 is moved radially inwardly of the circular path of the travel of the glass tube. At this time, the support 22 in its lowermost position and the pairs of pulley halves 25 and 26 and 27 and 28 are both closed to complete the pulleys 23 and 24. The latter have tube-engaging pieces mounted on the peripheries thereof, each of the tube-engaging pieces being brought into engagement with either a ring of a metal secured to a lower end of a glass tube or a reduced lower end portion of the glass tube. Then the support 22 is moved upwardly by the chain 54. The gears 55, 36 and 37 are rotated by the meshing engagement between a rack 52 (shown in FIG. 3) and a pinion 53 (shown in FIG. 2) so that the two heated glass tubes are bent about or wound on the pulleys 23 and 24, respectively. The upward movement of the support 22 is discontinued when the two glass tubes are completely wound on the pulleys 23 and 24. Then the link means 50 and 51 are moved away from the pulleys 23 and 25 by the hydraulic mechanisms mentioned above so that the pairs of pulley halves 25 and 26 and 27 and 28 are moved apart from each other, respectively. At this time, the axles 29 through 32 are slidably moved axially relative to the gears 55, 36 and 37, respectively. Because the axle 31 is double-splined, as discussed above, the axle 31 is required to advantageously have a short length for thin splines. For the reason, there is required a short distance between the two pulleys 23 and 24. This advantageously enables the apparatus of the invention to be small-sized and made compact.

When the pairs of the pulley halves are separated apart, the tube bender 20 is moved radially outwardly to its initial position and the glass tubes which have been formed into substantially annular shapes are moved to the next station S7. At the stations S7 and S8, exhausting tubes on ends of the annular glass tubes are connected to predetermined terminals of a head of a suction machine. The glass tubes are then moved to and through the stations 9 through 12 in which the glass tubes are exhausted. The glass tubes are then moved to the station 13 in which the exhausted glass tubes are filled with drops of mercury and a quantity of a rare gas such as argon gas. The glass tubes are finally moved to the station S14 in which the suction tubes on the glass tubes are sealed and the glass tubes are removed from the apparatus.

The apparatus of the embodiment shown in FIG. 1 of the drawings has an increased number of exhausting heads than those of prior art apparatus because, with the apparatus described and illustrated above, two glass tubes are subjected to simultaneous working operations at each of the heating, bending, exhaustion, filling, sealing and other stations. The apparatus is required to have a base of a large diameter for the appropriate indexing of tube supporting arms and strength of machine structure. This inevitably causes the entire apparatus, including the support arms, to have a large diameter, with a resultant problem that the inertia of the rotation of the base is increased to cause heavy vibration of the apparatus which adversely affects the production of fluorescent lamps and the maintenance of the apparatus.

Figure 4:
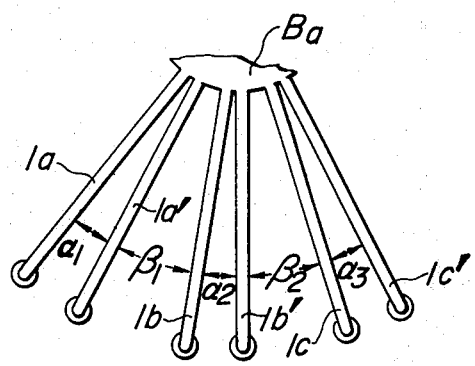
FIG. 4 is a fragmentary diagramatical plan view of another embodiment of the apparatus of the present invention with parts of the embodiment being removed.

FIG. 4 illustrates another embodiment of the present invention which has been designed to solve the above-discussed problem. The embodiment also has a plurality of support arms extending radially outwardly from a turret Ba, but these arms are so arranged that a pair of support arms 1b and 1b' which are to support a pair of glass tubes to be simultaneously subjected to the same working operation define between them an angle $\alpha_2$ which is less than an angle $\beta_2$ between the arm 1b' and an adjacent arm 1c or an angle $\beta_1$ between the arm 1b and an adjacent arm 1a' so that unequal angles are provided between the respective arms. in the embodiment of FIG. 4, the arms are shown as being arranged such that $\alpha_1 = \alpha_2 = \alpha_3 < \beta_1 = \beta_2$.

For example, assuming that the apparatus shown in FIG. 4 has (28 heads (28 assemblies of exhausting heads and support arms), the apparatus is allowed to have smaller angles to be defined between 14 arms (7 pairs of arms). Thus, the turret Ba is required to have a smaller diameter so as to satisfy the requirement for the indexing of the support arms on the base. Thus, the entire apparatus, including the support arms, can have a reduced diameter with a resultant advantage that the apparatus if free from the increase in the inertia and in resultant vibration of the apparatus which increase would otherwise be caused when the apparatus is rotated. Thus, the apparatus of this embodiment of the invention is advantageously freed from the problem discussed in connection with the embodiment of the invention shown in FIG. 1.

As having been described above, the present invention provides an apparatus for producing fluorescent lamps which is compact and small-sized and capable of producing fluorescent lamps at an improved productivity while the improvement in the productivity does not adversely effect the quality of the products. With the apparatus of the present invention, moreover, a heated and bent glass tube can be given a longer time for the annealing of the tube than by a machine which has a simply increased number of tube supporting arms with a resultant advantage that stress in the bent glass tube can be fully removed. Furthermore, the apparatus of the present invention has a shortened time required for the movement of a bent glass tube to the exhaustion stations. The movement in a shortened time enables the glass tube to be subjected to exhaustion for a prolonged time with a resultant advantage that the glass tube is fully exhausted, which contributes to the increase in the quality of products.

What we claim is:

1. An apparatus for producing annular fluorescent lamps comprising:

a turret which is intermittently rotated about its axis, a plurality of supporting arms mounted on said turret for rotation therewith and extending radially outwardly therefrom, exhaustion heads on the outer ends of said supporting arm for holding and supporting a plurality of glass tubes, a plurality of work stations on the path of travel of the glass tubes, a first work station comprising a heating means, a second work station comprising a bending means for bending two next adjacent glass tubes supported by two next adjacent exhaustion heads substantially simultaneously, and a third work station comprising an exhausting means, and means interconnecting said first and second bending means for effecting the substantially simultaneous operation thereof.

2. An apparatus as claimed in claim 1, in which said first bending means comprises a first pulley, said second bending means comprises a second pulley, and said first and second pulleys are coaxially arranged.

3. An apparatus as claimed in claim 2, in which each of said coaxial pulleys is formed of a pair of axially separable pulley halves, the adjacent pulley halves of said pulleys being connected by spline means so that said adjacent pulley halves are rotatable together but axially relatively movable toward and away from each other.

4. An apparatus as claimed in claim 1, wherein said heating means comprises means for heating two next adjacent glass tubes supported by two next adjacent exhaustion heads substantially simultaneously.

5. An apparatus as claimed in claim 1, wherein said exhaustion means comprises means for exhausting two next adjacent glass tubes supported by two next adjacent exhaustion heads substantially simultaneously.

6. An apparatus as claimed in claim 1, in which each pair of supporting arms for supporting a pair of glass tubes to be simultaneously subjected to the same working operation define therebetween an angle which is less than another angle defined between one of said pair of supporting arms and a next adjacent arm.

* * * * *